US008606633B2

(12) United States Patent
Tarbert et al.

(10) Patent No.: US 8,606,633 B2
(45) Date of Patent: Dec. 10, 2013

(54) PERIODICAL RECYCLING AND REWARD DISTRIBUTION SYSTEMS AND METHODS

(75) Inventors: Thomas D. Tarbert, Thornton, CO (US); Tamila Lane Romeis, Thornton, CO (US); Blake Ed Patterson, Thornton, CO (US)

(73) Assignee: ReMag, LLC, Thornton, CO (US)

( * ) Notice: Subject to any disclaimer, the term of this patent is extended or adjusted under 35 U.S.C. 154(b) by 455 days.

(21) Appl. No.: 12/723,902

(22) Filed: Mar. 15, 2010

(65) Prior Publication Data

US 2011/0225025 A1 Sep. 15, 2011

(51) Int. Cl.
*G06Q 30/00* (2012.01)

(52) U.S. Cl.
USPC ............ 705/14.37; 705/14.1; 705/14.11; 705/1; 235/375; 235/383; 235/385; 241/236

(58) Field of Classification Search
USPC ............ 705/14.37, 14.1, 14.11; 241/236; 235/375, 383, 385
See application file for complete search history.

(56) References Cited

U.S. PATENT DOCUMENTS

| 3,412,837 A | 11/1968 | Myers |
| 3,792,765 A | 2/1974 | Arp |
| 4,248,334 A | 2/1981 | Hanley et al. |
| 4,285,426 A | 8/1981 | Cahill |
| 4,492,295 A | 1/1985 | DeWoolfson |
| 5,111,927 A | 5/1992 | Schulze, Jr. |
| 5,257,741 A | 11/1993 | Rode et al. |
| 5,447,017 A | 9/1995 | Becher et al. |
| RE35,117 E | 12/1995 | Rando et al. |
| 5,566,066 A | 10/1996 | Weitzman et al. |
| 5,577,590 A | 11/1996 | Salda |
| 5,628,412 A | 5/1997 | Hulls |
| 5,708,782 A | 1/1998 | Larson et al. |
| 5,965,858 A | 10/1999 | Suzuki et al. |
| 6,151,587 A | 11/2000 | Matthias |
| 6,535,857 B1 | 3/2003 | Clarke, III et al. |
| 6,947,571 B1 * | 9/2005 | Rhoads et al. ............ 382/100 |

(Continued)

FOREIGN PATENT DOCUMENTS

| EP | 0685096 B1 | 1/1998 |
| WO | WO 0152702 A1 | 7/2001 |
| WO | WO 2007101255 A2 | 9/2007 |
| WO | WO 2009091908 A1 | 7/2009 |

OTHER PUBLICATIONS

International Search Report and Written Opinion of PCT/US2011/17466 mailed May 9, 2011, 7 pages.

(Continued)

*Primary Examiner* — Michael Bekerman
*Assistant Examiner* — Luis A Brown
(74) *Attorney, Agent, or Firm* — Kilpatrick Townsend & Stockton LLP (57) ABSTRACT

Methods and systems for recycling a periodical are described. The methods may include the step of providing periodical information about the periodical to a recycling device, where the periodical is deposited with the recycling device. The methods may further include calculating one or more of discount offers based on the periodical information, and displaying the one or more of discount offers at the recycling device. One or more of the discount offers may be selected at the recycling device, and the selected offers may be printed into a ticket, coupon, or some other printed material at the recycling device.

23 Claims, 6 Drawing Sheets

(56) References Cited

U.S. PATENT DOCUMENTS

| | | | |
|---|---|---|---|
| 6,954,732 B1* | 10/2005 | DeLapa et al. | 705/14.35 |
| 7,076,449 B2 | 7/2006 | Tsunenari et al. | |
| 7,328,842 B2* | 2/2008 | Wagner et al. | 235/385 |
| 7,344,063 B2* | 3/2008 | Wagner et al. | 235/375 |
| 7,881,965 B2* | 2/2011 | Bowles et al. | 705/14.37 |
| 7,886,973 B2* | 2/2011 | Wagner et al. | 235/385 |
| 8,195,511 B2* | 6/2012 | Bowles et al. | 705/14.37 |
| 2001/0051894 A1* | 12/2001 | Delapa | 705/14 |
| 2004/0056101 A1* | 3/2004 | Barkan et al. | 235/472.03 |
| 2004/0199401 A1* | 10/2004 | Wagner et al. | 705/1 |
| 2005/0216120 A1 | 9/2005 | Rosenberg et al. | |
| 2005/0267804 A1 | 12/2005 | Lonsbury et al. | |
| 2006/0069588 A1* | 3/2006 | Ritter | 705/1 |
| 2006/0255137 A1* | 11/2006 | Wagner et al. | 235/385 |
| 2007/0100694 A1 | 5/2007 | Kopps | |
| 2007/0260466 A1* | 11/2007 | Casella et al. | 705/1 |
| 2007/0276686 A1 | 11/2007 | Hunscher et al. | |
| 2008/0041996 A1* | 2/2008 | Shaw et al. | 241/236 |
| 2008/0133264 A1* | 6/2008 | Wagner et al. | 705/1 |
| 2008/0169342 A1* | 7/2008 | Gonen | 235/375 |
| 2008/0223928 A1* | 9/2008 | Wagner et al. | 235/383 |
| 2008/0249878 A1 | 10/2008 | Fajkowski | |
| 2008/0255901 A1* | 10/2008 | Carroll et al. | 705/7 |
| 2008/0296374 A1* | 12/2008 | Gonen et al. | 235/385 |
| 2009/0113116 A1 | 4/2009 | Thompson et al. | |
| 2009/0276299 A1 | 11/2009 | Gonen et al. | |
| 2009/0319354 A1 | 12/2009 | Gonen et al. | |
| 2010/0100229 A1* | 4/2010 | Whitson et al. | 700/225 |
| 2011/0186624 A1* | 8/2011 | Wagner et al. | 235/375 |
| 2012/0029980 A1* | 2/2012 | Paz et al. | 705/14.1 |

OTHER PUBLICATIONS

International Search Report and Written Opinion of PCT/US2011/027466 mailed May 9, 2011, 7 pages.

* cited by examiner

PERIODICAL RECYCLING AND REWARD DISTRIBUTION SYSTEMS AND METHODS

BACKGROUND OF THE INVENTION

Consumer recycling programs continue to find increased public support as a way to reduce pollution, reduce energy costs associated with the manufacture of goods and materials, and reduce the costs and environmental impact of permanent waste disposal. Many of these recycling programs have been in wide use for decades, starting with materials that were expensive to produce and the most prone to pollution problems. For example, many state governments developed beverage container deposit programs to encourage the recycling of aluminum beverage cans that were expensive to make and a large source of litter around roads and parks. These programs typically assessed an upfront deposit cost of 5 to 10 cents per beverage can that would be refunded when the can was returned to a recycling location (e.g., a store where such beverages could be purchased).

As the popularity of recycling programs increased, additional materials have been incorporated into these programs. Today, glasses, plastics and paper are all widely recycled through programs that provide curbside pickup as well as drop-off at recycling centers and retail outlets. In many instances, the consumer is offered no refund or incentive for recycling the materials other than the satisfaction of recycling these materials instead of having them dumped into a permanent waste area. In some cases, the consumer receives a monetary refund based on the number of items or weight of the recyclable materials, such as the deposit container deposit programs described above.

While the environment benefits of recycling are well established, the economic sustainability of these programs can be more challenging. One source of revenue for these programs is to sell the recyclable materials back to manufacturers and producers. However, this revenue depends on competitive and potentially volatile markets for the recycled goods. These markets can be especially challenging when the cost of production for new material is close to the cost of using recycled material. In many instances, recycling programs are not economically sustainable when they are exclusively dependent on the sale of the recycled goods to fund the costs of the program.

Typically, additional sources of revenue are required to fund recycling programs. For example, the beverage can deposit programs include revenue from consumers who are assessed the deposit costs at the point-of-sale. Money from cans that are never redeemed (and interest on the deposit money) typically help defray the costs of the program itself. Consumers also typically pay taxes to cover a portion of the costs for government recycling programs, and fees to participate in recycling programs operated by privately owned waste disposal companies. However, there may be political pressure to reduce revenues from taxes, and consumer participation pressure to reduced fees by privately owned companies.

Thus, recycling programs could benefit from the creation of new sources of revenue to build and maintain the programs. Such additional revenue sources would be especially useful when revenues from the sale of the recycled materials are relatively low, such as recycled paper for magazines and other periodicals. The programs could also benefit from the creation of new incentives to get consumers to participate. These and other efforts are addressed in the present application.

BRIEF SUMMARY OF THE INVENTION

Methods and systems for recycling periodicals are described that include the collection of information from the recycled periodical to determine an incentive to offer a consumer who recycles the periodical. The recycling systems may operate at locations where consumers regularly gather (e.g., a grocery store, bookstore, etc.) and may offer incentives such as coupons and other discount offers for goods and services that are readily redeemable. The methods and systems are capable of not only generating revenue from the recycled periodical materials, but also from various parties that can benefit from the methods and systems, including periodical publishers and distributors, advertisers, and merchant stores, among others. The methods and systems also incentivize consumers to participate in periodical recycling programs when they would otherwise dispose of the periodicals as non-recyclable waste.

Embodiments of the invention include methods of recycling a periodical. The methods may include the step of providing periodical information about the periodical to a recycling device, where the periodical is deposited with the recycling device. The methods may further include calculating one or more of discount offers based on the periodical information, and displaying the one or more of discount offers at the recycling device. One or more of the discount offers may be selected at the recycling device, and the selected offers may be printed into a ticket, coupon, or some other printed material at the recycling device.

Embodiments of the invention may further include a system to recycle periodicals. The system may include a scanning device to collect periodical information from the periodical, and a processor to calculate one or more discount offers based on the periodical information. The system may further include a display device to display the one or more discount offers, and an input device to selected one or more of the displayed discount offers. The system may still further include a printing device to print the one or more selected discount offers and a receptacle to hold the recycled periodical.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Methods and systems are described for recycling periodicals, such as newspapers, magazines, crossword puzzles, comic books, and a variety of other types of periodicals. The methods and systems provide discount offers that not only encourage users to recycle their used periodicals, but also purchase new periodicals and/or other goods and services at the recycling site (e.g., a retail establishment such as a supermarket, bookstore, etc.). These discount offers may take the form of coupons offered by the recycling system based on information about the recycled periodicals. A user who deposits the recycled periodicals may redeem the coupons for discounted prices on more periodicals and/or other goods and services.

Exemplary Recycling Methods

Figure 1:
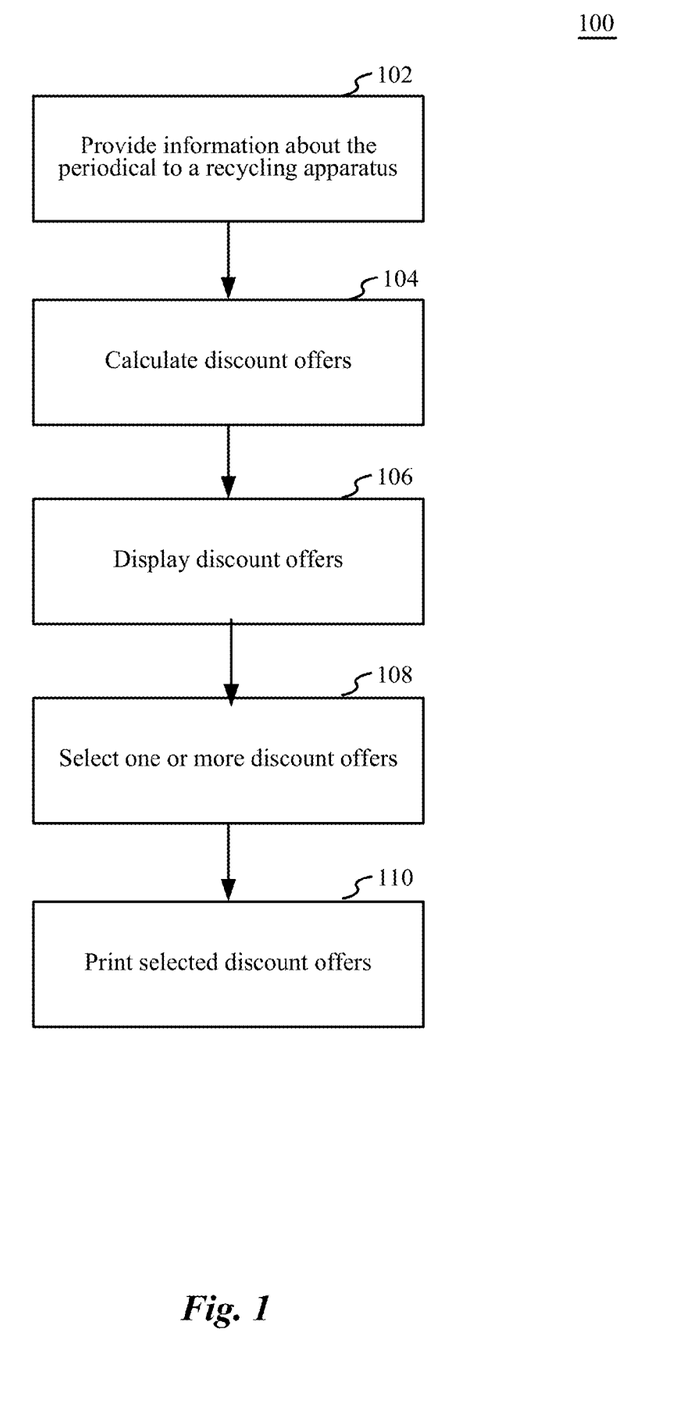
FIG. 1 illustrates a flow chart with selected steps in a periodical recycling method according to embodiments of the invention.

FIG. 1 shows a flow chart with selected steps in an exemplary method 100 of recycling periodicals according to embodiments of the invention. The method 100 may include the step of providing periodical information about a periodical to a recycling device 102. The periodical information may be provided by a user (e.g., a consumer) who deposits one or more periodicals with the device for recycling.

The periodical information may be provided to the recycling device in a number of ways, including scanning bar code information printed on the periodical and/or having the user manually input periodical information into the recycling device. The periodical information may be further provided by positioning the periodical so that an optical character recognition device may optically scan the periodical and/or the user may select the periodical information from one or more drop down lists and/or buttons displayed through a user interface.

Periodical information may include the periodical's name, date, publisher, volume, subject matter category, type (e.g., newspaper, magazine), etc. The periodical information may also include subscriber information including the subscriber's name and/or business name, address, length of subscription, etc., and/or purchasing and/or recycling information including a purchase date, purchase location, recycle date, recycle location, and number of previous periodicals recycled, among other kinds of information.

The recycling device may perform a validation of the periodical and inform the user whether the periodical was validated or not. Validating the periodical may include verifying whether the periodical's publisher is enrolled in a recycling program associated with the recycling device. The recycling device may use the periodical information (e.g., the periodical's name) to verify that the publisher is enrolled in the recycling program. The periodical information may be compared with one or more databases of enrolled publishers to determine if the periodical's publisher is enrolled. The databases may be either internal or external to the recycling device or both.

One or more discount offers (e.g., incentives) may be calculated based on the periodical information supplied 104. The calculations may be performed by the recycling device itself, or by a remote system that receives the periodical information from the recycling device and returns information about the discount offers to the device. Calculating discount offers may include selecting discount offers (e.g., coupons) for the same periodical or a similar periodical and may depend upon the periodical's name and/or subject matter category, among other factors. For example, a coupon for a new issue of the recycled periodical may be selected. Discount offers for similar periodicals may be selected based upon research showing that readers of one type of periodical often prefer other types of periodicals, or may be selected based upon additional periodicals published by the publisher. Calculating discount offers may also include selecting discount offers for products that are offered and/or advertised in the periodical and/or that are similar to the periodical's subject matter category (e.g., selecting a coupon for sports equipment based on recycling a sports magazine). The calculated discount offers may depend on whether the periodical was validated, for example, whether the periodical's publisher is enrolled in a recycling program. A set of premium discount offers may be selected if the periodical is validated. Alternatively, a set of default discount offers may be selected if the periodical is not validated.

The calculated discount offers may be displayed at the recycling device 106. The offers may be displayed on a display screen that forms part of the recycling device. The display screen may display a single offer at a time, or a plurality of offers at the same time. The offers displayed may be a set of premiums offers or default offers or both and may depend on whether the periodical was validated or not. The display screen may also display advertisements as part of the displayed offers, at times other than when offers are displayed, or both. The advertisements may be associated with, and/or provided by, a variety of retail establishments including grocery stores, book stores, departments stores, manufacturers, service providers, and other establishments. The advertisements may be directed toward the periodical and/or other periodicals, the publisher, products related to the periodical, the retail establishment, etc. and may be in the form of videos, images, audio, etc.

One or more of the offers may be selected 108. When only a single offer is provided it may be selected automatically, while user input may be requested for selecting from a plurality of offers. When a touch screen display is used to display the offers, an offer may be selected by pressing an area on the touch screen (e.g., a soft key displayed on the screen) indicating selection of the offer. In another example, the recycling device may include a keypad or buttons that select an offer when pressed in the proper order.

Once an offer is selected, it may be printed from a printing device incorporated into the recycling device or located proximate to the recycling device 110. The printed offer may include information about the offer including, but not limited to, a percentage and/or currency amount of a discount on a good or service, a description of the good or service (e.g., a periodical title), an expiration date for the offer, a location where the offer may be executed (e.g., a specific retail establishment, a chain of retail stores, etc.), and terms and conditions of the offer, among other information. The printed offer may also include a bar code that may be automatically read by a bar code scanner or similar device at a merchant point-of-sale.

Examples of printed offers include coupons for a discounted or free copy of a periodical that may be redeemed with a retail establishment and/or for a product that is related to the periodical (e.g., a coupon for sporting equipment). Additional examples may include a subscription offer for one or more periodicals at a discounted price that may be mailed to a distributor or publisher, similar to the detachable inserts commonly placed inside magazines and other periodicals. The printed offer may also include coupons, vouchers, and/or rebates provided by merchants, manufacturers, service providers, etc. For example, the printed offer may be a manufacturer's coupon or rebate for a product featured in the periodical and/or the printed offer may be a merchant's coupon redeemable for discount on a product sold by the merchant. Although the method has been described as printing the discount offer, the discount offer may be provided in a variety of other ways including displaying a coupon or rebate code, sending a discount via mail and/or through a network (e.g., an email), among other ways.

Embodiments of the method may further include verifying that the periodical has been deposited with the recycling device before the offers are calculated, displayed, selected, and/or printed. Verifying that the periodical has been deposited may include detecting that the periodical has been placed within a receptacle that collects recycled periodicals. The detection process may include detecting the movement of a periodical passed a sensor, detecting a periodical's weight in the receptacle, detecting a periodical's title or other information in the receptacle by using optical character recognition techniques, or through another detection method.

Embodiments of the invention may further include detecting when the receptacle is full of periodicals and thus, cannot accept more periodicals. Detecting when the receptacle is full may include using a sensor to detect when a portion of one or more periodicals is positioned above the upper surface of the receptacle, detecting when the weight of the periodicals in the receptacle is above a predetermined weight limit that signals the receptacle is full, using an optical device to optically detect when the receptacle is full, etc.

Embodiments of the invention may further include defacing the recycled periodical to prevent the periodical from being returned to the publisher as if unsold. Defacing the periodical may include using a shredder to shred the periodical, using a defacing mechanism to deface, mark, erase, and/or remove one or more portions of the periodical (e.g. stamp and/or mark the cover, remove the periodical's cover, etc.), etc.

Figure 2:
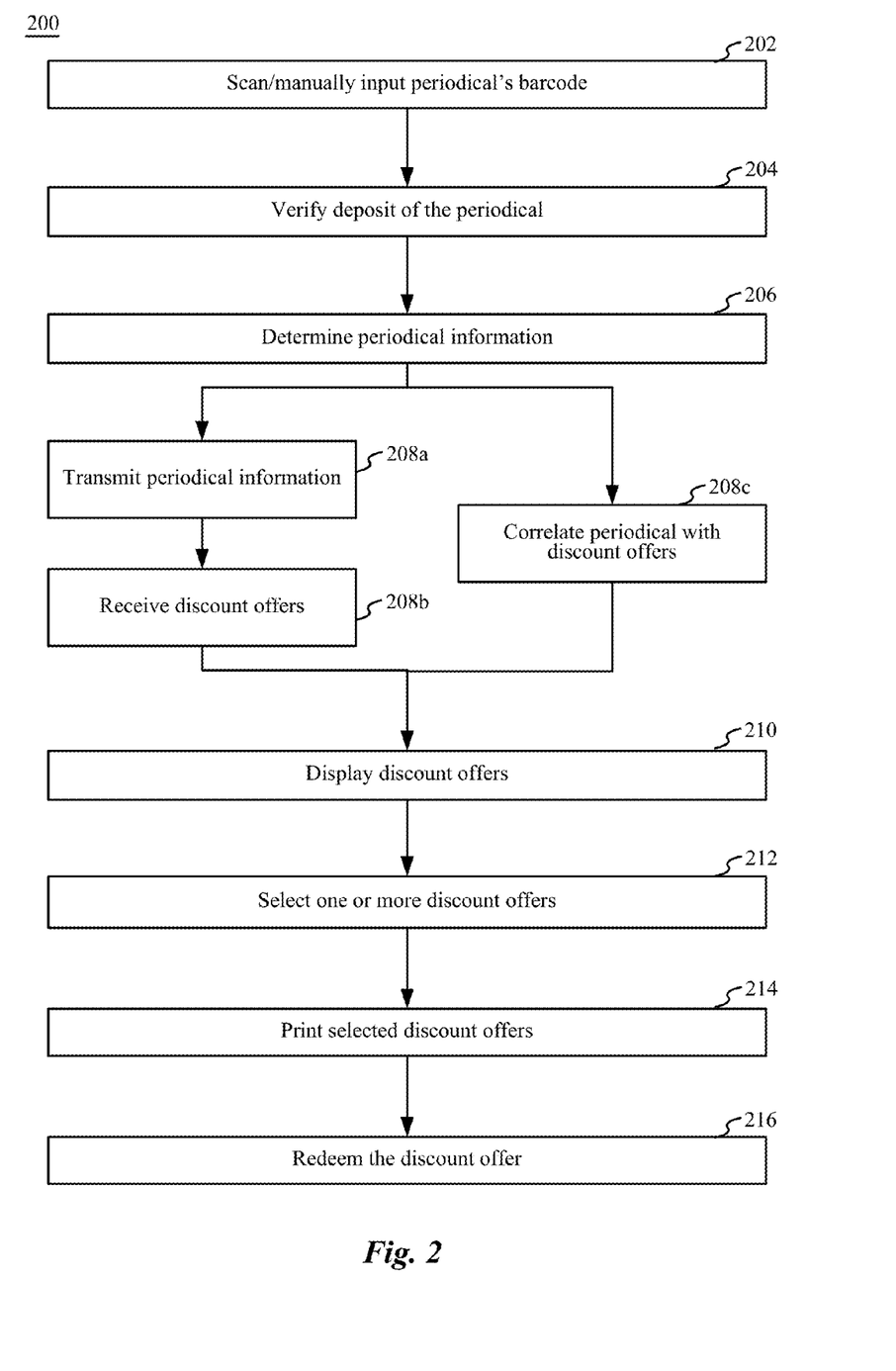
FIG. 2 illustrates a flow chart with selected steps for an additional periodical recycling method according to embodiments of the invention.

Referring now to FIG. 2, another flow chart with selected steps in a method of recycling 200 according to embodiments of the invention is shown. The method 200 may include the step of scanning bar code information printed on the periodical and/or having the user manually input periodical information in to the recycling device 202 to provide the recycling device with information about the periodical.

A verification may then take place to confirm that the periodical has been deposited with the recycling device 204. The verification may be performed through the use of one or more sensors that confirm that the periodical has been placed in a receptacle that collects recycled periodicals. Information about the periodical may then be determined 206 based on the bar code scanning and/or information manually input by the user. The information may include, among other things, information about the periodical including the title, subject matter category, subscription information, etc. and/or may include information about the publisher including the publisher's name, whether the publisher is enrolled in a recycling program, etc. Determining a periodical's information may further include validating the periodical by determining whether the periodical's publisher is enrolled in a recycling program associated with the recycling device. The determining process may be performed internal to the recycling device such as through the use of a processor and/or database, or external to the recycling device, or both.

One or more discount offers may then be calculated for the periodical. The discount offer calculation process may involve correlating the periodical with one or more discount offers. The periodical may be correlated with one or more discount offers 208c through the use of a processor and/or database internal to the recycling device. Or, alternatively, the periodical information may be transmitted to a remote device 208a through the use of a network (e.g., the Internet) and one or more discount offers may be subsequently received from the remote device 208b through the network. In other embodiments, some of the correlation may be done internal to the recycling device while the remainder is done external to the recycling device. The periodical information (e.g., the periodical's name, subject matter category, etc.) may be used to correlate the discount offers and the correlation may depend on whether the periodical was validated or not. The discount offers may be in the form of coupons, rebates, voucher, or other forms of discounts.

The discount offers may be displayed at the recycling device 210 on a screen that forms part of the discount device. A selection of one or more discount offers may then be made 212 such as through the use of a device including, but not limited to, a touch screen interface, keypad, buttons, etc. The selected offers may be printed 214 via a printer that is part of the recycling device or proximate to the recycling device. And the discount offer may be redeemed 216 for a discount such as by, for example, redeeming a coupon on a subsequent periodical purchase at a merchant point-of-sale or submitting a rebate for a purchase product.

The periodical may be defaced using a defacing mechanism (e.g. shredder, marking and/or defacing mechanism, etc.) to signal that the periodical has been recycled and prevent the periodical from being returned to the publisher. One or more sensors may also detect when the receptacle that collects recycled periodicals is full, such as through sensing when the weight of periodicals in the receptacle exceeds a predetermined limit, sensing when a portion of one or more periodicals is positioned above the receptacle's upper surface, etc.

Although the method is described as occurring in a particular order and with a particular number of steps, the method may be performed with fewer or additional steps and that the sequence of the steps may be rearranged. For example, the verification process is depicted as occurring before block 206. The verification process may, however, occur at anytime in the method, or optionally not occur at all.

Exemplary Recycling Systems

Figure 3:
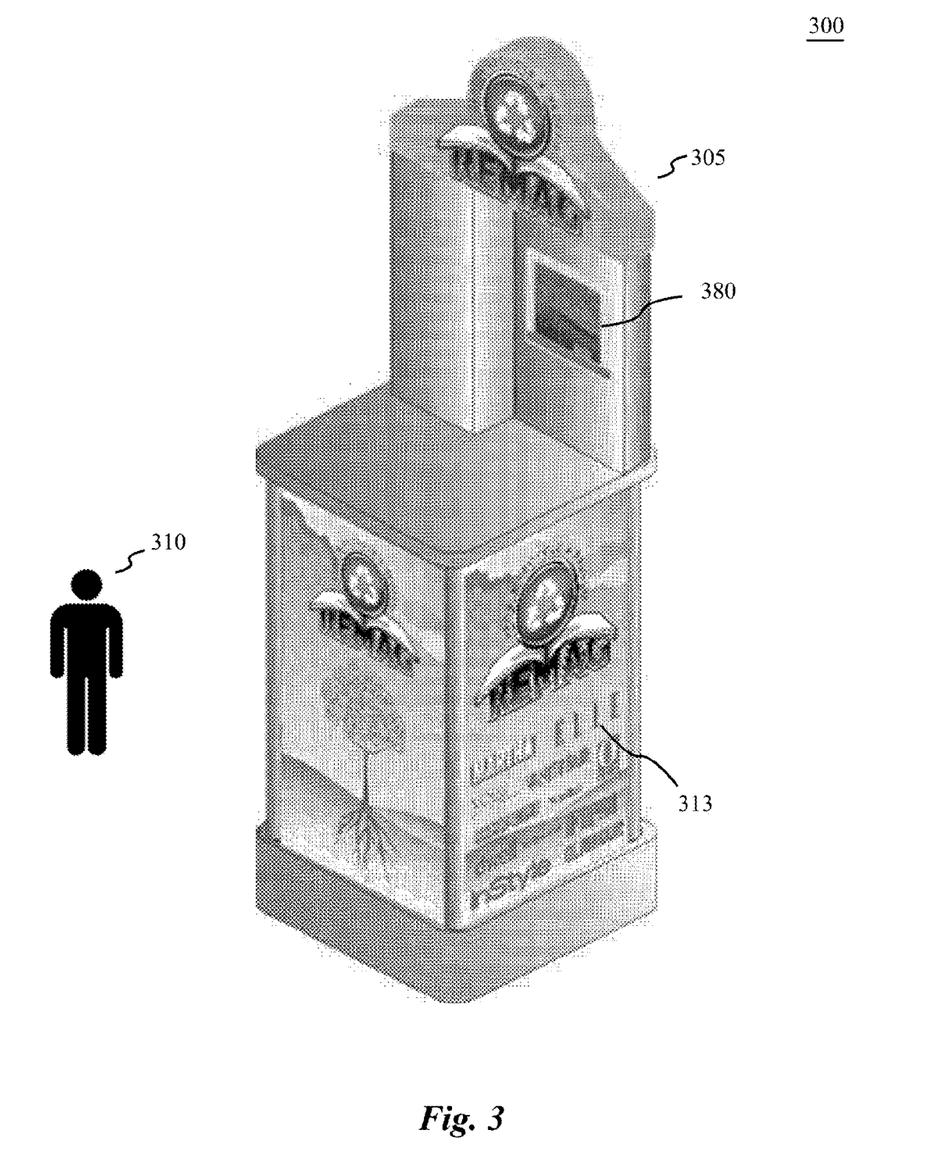
FIG. 3 illustrates a recycling device according to one embodiment of the present invention.

FIG. 3 shows an exemplary recycling device 300 according to embodiments of the invention. The recycling device 300 may include a kiosk 305 that allows a user 310 to deposit periodicals with the kiosk and that provides discount offers to the user in exchange for recycling the periodical. The kiosk 305 may be a stand alone device that may be located in a variety of locations in or around a retail establishment such as in a grocery store. Preferably the kiosk 305 is located in areas of high user traffic such as in close proximity to a merchant's checkout and/or in close proximity to periodicals to encourage recycling. The kiosk may have one or more user interfaces 380 that display information (e.g., discount offers) to users and that receive inputs from user (e.g., selection of discount offers). One or more advertisements may be displayed on the exterior of the kiosk 313 and/or on the user interface 380 such as advertisements associated with publishers, periodicals, merchants, etc.

Figure 4:
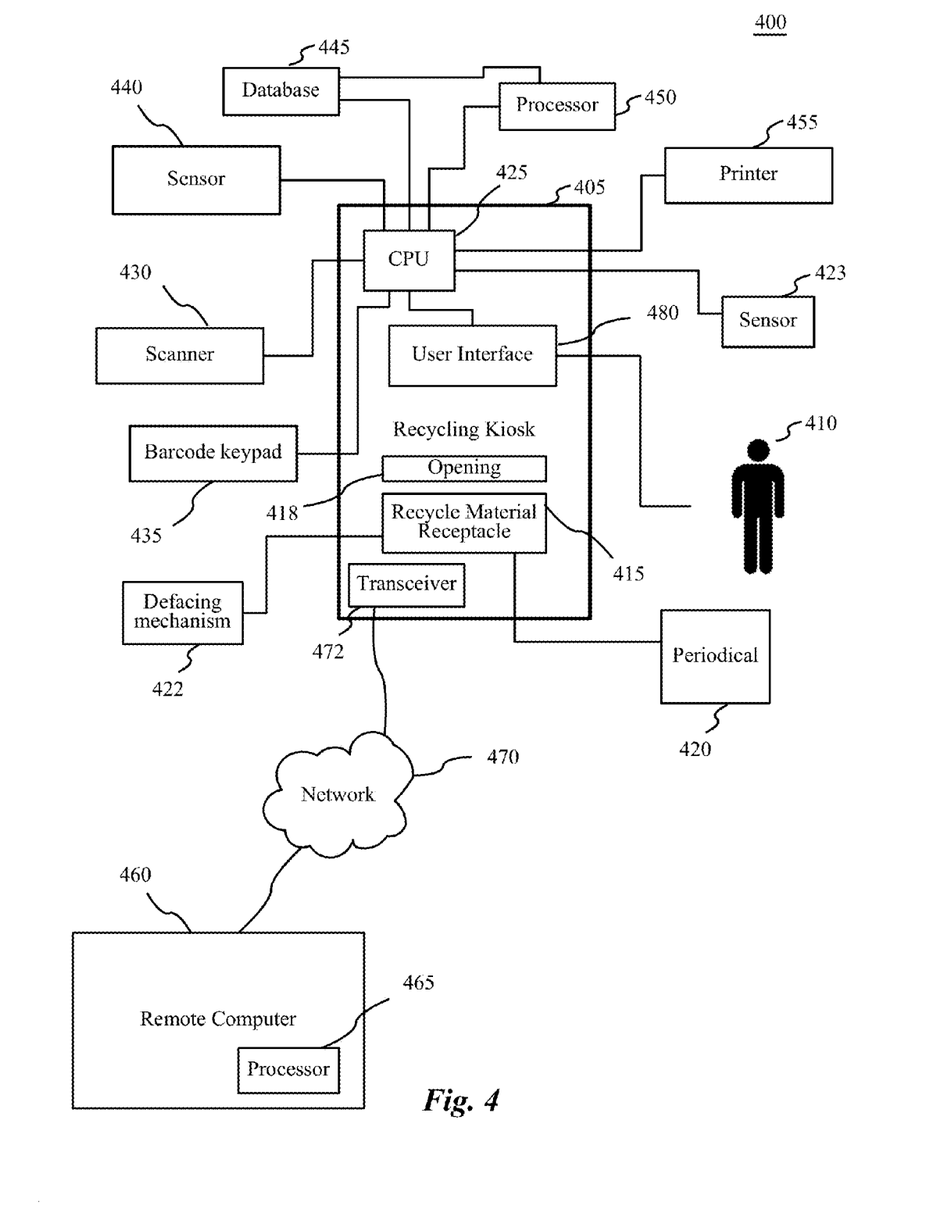
FIG. 4 illustrates a block diagram of a recycling device including several components in accordance with one embodiment of the present invention.

Referring now to FIG. 4, a simplified block diagram of a recycling device 400 including several components according to embodiments of the invention is illustrated. The recycling device 400 may include a kiosk 405 that allows a user 410 to recycle a periodical 420, and that provides one or more discount offers (not shown) in exchange for recycling a periodical 420.

Recycling kiosk 405 may have a user interface 480, such as a touch screen interface, that allows a user 410 to interact with one or more applications of the recycling kiosk. User interface 480 may display information to the user (e.g., advertisements and instructions) and receive one or more inputs from the user (e.g., selection of discount offers). The user interface may display dynamic video images and/or display still images such as for advertisements and/or instructions. The user interface may be communicatively coupled with a central processing unit (CPU) 425 that carries out computer instructions and/or facilitates the operation of the recycling kiosk 405. CPU 425 may be communicatively coupled with a scanner 430 to scan a periodical's barcode and send information about the periodical to the CPU 425. The CPU may use this information to validate the periodical including determining if the periodical's publisher is enrolled in recycling programs associated with the recycling device 400. Additionally, the CPU 425 may be communicatively coupled with a barcode keypad 435 to allow a user to manually input periodical information (e.g., barcode information) into the recycling kiosk. The keypad may be a hardware device that is physically connected to the kiosk 405 and/or may be a software application in which a keypad representation is displayed on the user interface 480 and the user inputs information by touching portions of the screen representing individual numbers and/or letters.

The user interface 480 may prompt the user 410 for input and/or direct the user to perform an action. For example, the user interface may prompt the user to input information about the periodical and/or prompt the user to deposit the periodical with the recycling kiosk 405. The kiosk may have a periodical receiving opening 418 (e.g., a slot) that allows a user to insert the periodical into the recycling kiosk and deposit the periodical with the recycling kiosk. A receptacle 415 may be located below opening 418 to receive the deposited periodicals. The receptacle 415 may have controlled access so that its contents may be regularly emptied by authorized personnel. The kiosk may have a defacing mechanism 422 located at or near the receptacle 415. The defacing mechanism may mark, erase, remove a portion of, and/or otherwise deface a periodical 420 to prevent the periodical from being returned to the publisher as if unsold.

The kiosk may have a sensor 440 communicatively coupled with the CPU 425 and located at or near the opening 418. The sensor 440 may sense and verify that a periodical 420 has been deposited with the kiosk 405. Further, the sensor 440 may verify that the periodical deposited with the kiosk 405 matches with the periodical that was scanned and/or manually input into the kiosk. The kiosk may have an additional sensor 423 that is communicatively coupled with the CPU 425 and located at or near the receptacle 415. The additional sensor 423 may detect when the receptacle is full of periodicals and, therefore, unable to accept additional periodicals. In some embodiments, sensor 440 may verify when the periodical has been deposited and when the receptacle is full of periodicals.

The CPU 425 may participate in the calculation of the discount offers to provide a user 410. The CPU 425 may calculate the offer by selecting one or more discount offers based on the type and validation of the periodical recycled. Alternatively, the CPU 425 may be communicatively coupled with a different processor 450 that determines the discount offers to provide. Information about the periodicals and/or discount offers may be stored on a database 445. The CPU 425 and/or the processor 450 may access the database 445 to obtain the information about the periodicals and/or discount offers and use this information to determine which discount offers to provide to the user. The discount offers selected by the CPU 425 and/or processor 450 may be displayed to the user on the user interface 480. The user 410 may then select one or more of the discount offers. Selection may be made though the user interface 480 (e.g., selecting a portion of a touch screen interface associated with a discount offer) or through another device (e.g., keypad or mouse). A printer 455 may be communicatively coupled with the CPU 425 so that the user's selected discount offer may be printed out for subsequent redemption at a retail establishment or other entity.

The kiosk 405 may be a self contained unit capable of receiving periodicals and providing discount offers independent of any external device and/or application, or may communicate with a remote computer 460 to perform periodical recycling functions. Kiosk 405 may be configured to have a data transceiver 472 that may communicate with a remote computer 460 through a wired or wireless connection. The data transceiver 472 and remote computer 460 may both be communicatively coupled to a computer network 470, such as the Internet. The kiosk 405 may send periodical information via computer network 470 to the remote computer 460 and receive one or more discount offers from the remote computer 460 via the computer network 470. The remote computer 460 may include a processor 465 that is designed to validate a periodical and calculate one or more discount offers for the periodical depending on the periodical type and validation. The remote processor 465 may perform the validation prior to or contemporaneous with calculating the discount offers. In calculating the discount offers, the processor 465 may access a database 445 that may be internal to or external to the kiosk 405 and receive information from the database 445.

Figure 5:
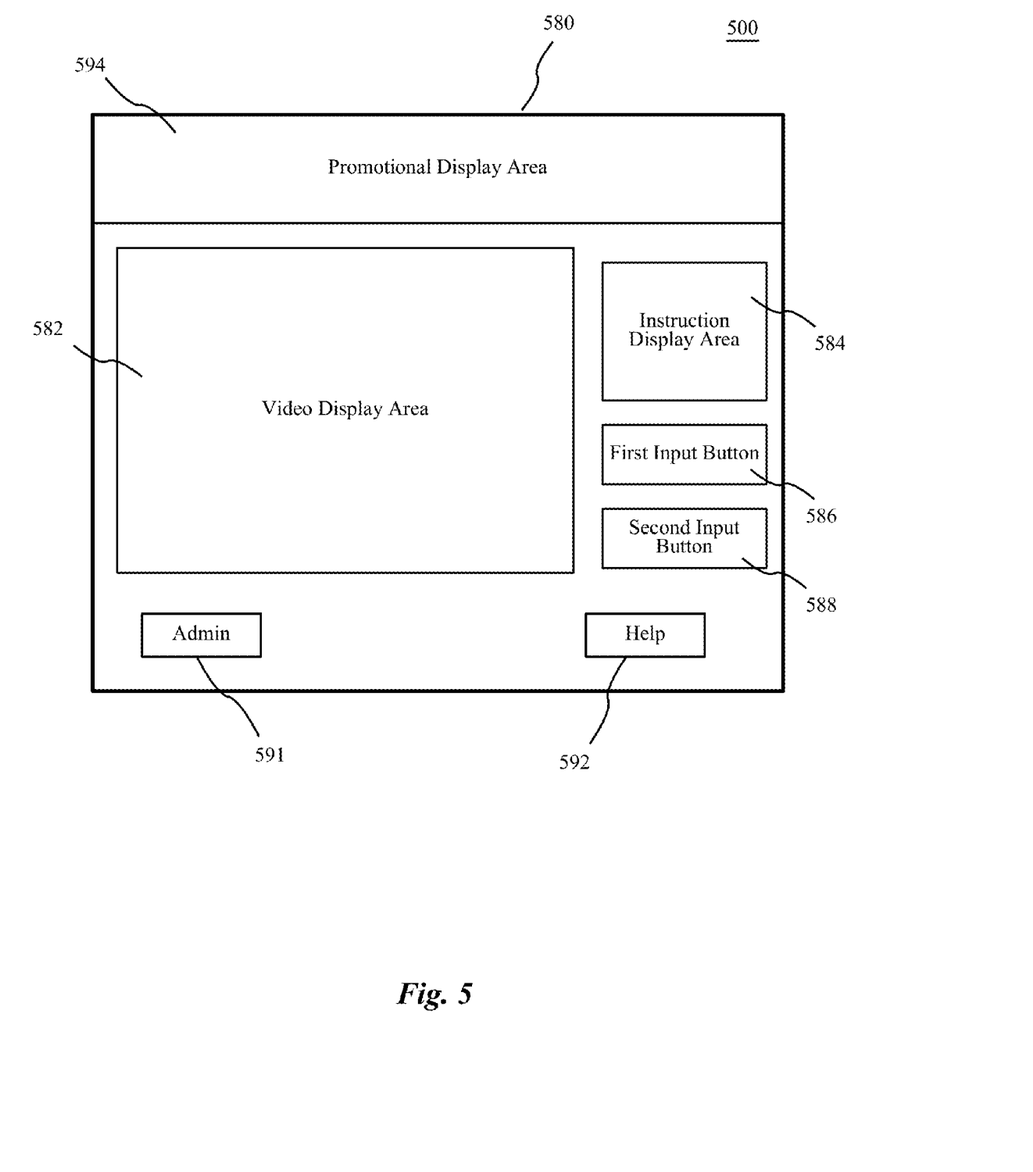
FIG. 5 illustrates a block diagram of a user interface of a recycling device in accordance with one embodiment of the present invention.

Referring now to FIG. 5, a block diagram 500 of a recycling device's user interface 580 according to embodiments of the invention is illustrated. The user interface 580 may display a start screen at the beginning of the user-recycling device interaction. The user interface 580 may be a touch screen interface display that displays information to a user (e.g., a consumer) and receives inputs from a user. The user interface may have a video display area 582 that dynamically displays video content such as advertisements and/or instructions. The video display area may display default advertisements while the recycling device is not in operation and may update or change the advertisement when a user interacts with the user interface 580. The advertisements displayed may depend on the type of periodical that the user recycles.

The user interface 580 may have an instruction display area 584 that provides step by step instructions to assist the user in operating the recycling device. For example, the instruction display area 584 may initially display a greeting message and instruction directing the user to scan a periodical's barcode. The video display area 582 may display advertisements and the instruction display area 584 may display step by step directions as the user operates the recycling device. The user interface 580 may also have a promotional display area 594 that displays promotional material for retail establishments, periodical publishers, recycle device providers (e.g., distributors), etc. The promotional display area may display a name, trade logo, and/or one or more slogans associated with a retail establishment, periodical publisher, recycle device provider, etc.

The user interface 580 may have one or more input buttons such as a first input button 586 and a second input button 588 that allow the user to input information into the recycling device. For example, the first input button 586 may display advertisements and/or instructions in a first language and the second input button 588 may display advertisements and/or instructions in a second language. Alternatively or additionally, the first and second input buttons may allow the user to access different user options and/or screens such as a drop down menu for selecting periodical information. The user interface 580 may have a help button 192 that provides additional instructions in case a user is unsure how to proceed and/or may have an administrator button 591 that provides access to features that allow calibration and/or configuration of the recycling device such as configuring the user interface's display, the types of discount offers provided, updating and/or upgrading software, etc.

Figure 6:
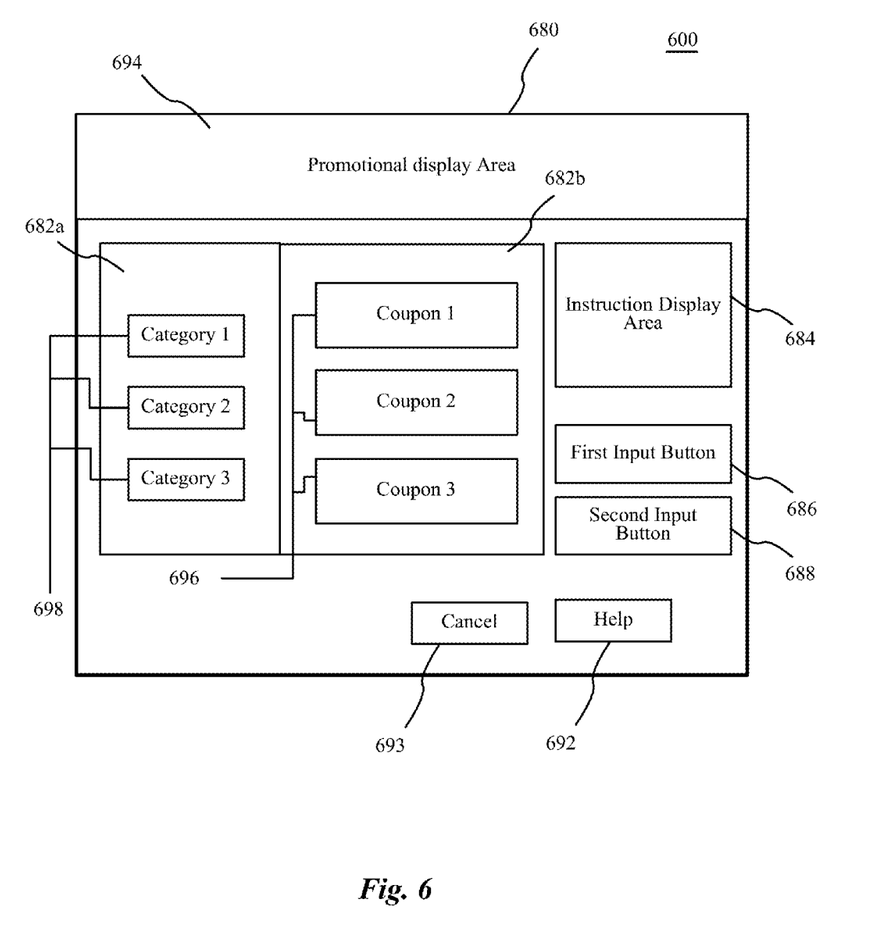
FIG. 6 illustrates an additional block diagram of a user interface of a recycling device in accordance with one embodiment of the present invention.

Referring now to FIG. 6, an additional block diagram 600 of a recycling device's user interface 680 according to embodiments of the invention is illustrated. The user interface 680 may display a user interface's screen after a user has initiated interaction with the recycling device. User interface 680 may have a promotional display area 694, instruction display area 684, first input button 686, second input button 688, and help button 692 similar to the user interface 580 in FIG. 5. The user interface 680 may also have a cancel button 693 to allow a user to cancel the recycling process.

A video display area 682 may be divided into two portions 682a and 682b to display discount offer categories 698 and individual discount offers 696 respectively. Video display portion 682b may display one or more individual discount offers 696 such as a coupons, vouchers, rebates, etc while video display portion 682a may display one or more discount offer categories where each category contains individual discount offers associated with the category such as grocery, publisher, retail, dining, etc. A user may select one or more discount offers from video display portion 682b and/or may select one or more discount offer categories from video display portion 682a to display discount offers associated with that particular category. For example, if the user is interested in discount offers for groceries, the user may select the grocery category from video display portion 682a and corresponding grocery discount offers will be displayed in video display portion 682b.

The discount offers 696 displayed in video display portion 682b and the discount offer categories 698 displayed in video display portion 682a may be either premium discount offers and categories or default discount offers and categories or both depending on whether the periodical was validated or not. After the periodical is scanned, the instruction display area 684 may display whether the periodical is validated or not. If the periodical is validated, the instruction display area 684 may direct the user to select one or more discount offers 696 and/or one or more discount offer categories 698. If the periodical is not validated, the instruction display area 684 may display that the periodical was not validated and/or may display that the user may still receive one or more default discount offers for recycling the periodical with the periodical device. The user may then select one or more default discount offers 696 and/or one or more default discount offer categories 698.

The instruction display area 684 may further display an instruction directing the user to deposit a periodical, whether validated or not, with the recycling device. The deposit instruction may occur before, after or concurrent with the display of discount offers and/or discount offer categories. The first input button 686 may allow the user to access and/or view selected discount offers 696 and add additional discount offers and/or remove selected discount offers. The second input button 688 may allow the user to finalize a selection and print the selected discount offers 696.

In one embodiment, only a single discount offer may be provided for a recycled periodical. In such an embodiment, the user interface 680 may display the discount offer in video display 682 (i.e. video display 682 is not divided into portions) and the instruction display area 684 may direct the user to finalize and print the discount offer, such as through selecting the second input button 688, or cancel the recycling transaction, such as through selecting the cancel button 693.

Exemplary Revenue Generation Methods and Systems

The recycling device can generate revenue for a variety of entities including retail establishments, manufacturers, publishers, and providers of recycling devices (e.g., distributors), etc. The revenue may be in the form of licensing agreements, manufacturing, sales, processing fees for coupon redemption, recycling fees, advertising, etc. Additionally, entities and/or individuals using and/or associated with the recycling device may generate goodwill for providing and encouraging environmental responsibility. Goodwill may be generated by and/or for users, retail establishments, manufacturers, publishers, etc.

Revenue may be generated from advertising with the recycling device. The advertisements may include product and/or service advertisements for publishers, manufacturers, retail establishments, service providers, etc. Advertisements may be displayed on the exterior of the recycling device and/or on a user interface through video displays and/or still images. Additionally, advertisements may be included with and/or printed on the discount offers such as printing a tradename or logo on a coupon, rebate, voucher, etc. Advertisements may be selected and displayed based on the user, the type of periodical recycled, the merchant location and/or recycling device location, among other factors. Advertisement agreements between advertisers and entities associated with the recycling device may be based on monthly fees, the recycling device location, and/or the subject matter category for the advertisement, among other considerations.

Revenue may be generated through licensing the recycling device. A licensing fee agreement may be implemented between recycling device providers (distributors) and one or more retail establishments desiring to provide recycling devices and/or implement recycling programs. Retail establishments may license recycling devices and/or may license floor space within or around the retail establishment for the recycling device. A recycling program fee agreement may be implemented between entities using and/or providing the recycling device and publishers that enroll in a recycling program associated with the recycling device. The recycling program fee agreement may be based on the number of periodicals published by the publisher, and/or the amount of periodicals recycled that are associated with the publisher, among other conditions.

Revenue may be generated from manufacturing and/or sales of recycling devices and/or recycling device software. Providers of recycling devices may enter into sales contracts with retail establishments to sell and/or provide a number of recycling devices. Software updates and/or upgrades for the recycling device may be sold to retail establishments and/or a service agreement may be implemented for servicing and/or updating pre-existing recycling devices.

Revenue may be generated from discount offer redemption. Discount offer redemption revenue may come from one or more processing fees associated with redeeming the discount offers such as processing fees for redeeming coupons at a point-of-sale. Additionally, revenue may come from information associated with discount offer redemption. Information about a user's purchase may be tracked through a redemption system such as a merchant's sales/coupon redemption system. The information may include the type of item purchased, the location of the purchase and/or recycling, the discount offer selected, etc. The information may be compiled and analyzed to provide data about user habits such as purchasing and/or recycling habits, product preferences, retail establishment preferences, etc. The information may be used by and/or sold to a variety of entities such as manufacturers, retailers, recycling advocates, etc. For example, the information may be used to advertise the advantages of the recycling device, forecast market trends, determine user wants, among other uses.

Revenue may be generated from recycling processes. Recycling agreements and associated fees may be implemented between recycling companies and entities associated with the recycling device where the entity provides recycling material to the recycling company in exchange for a fee. For example, a local retail establishment may enter into a recycling agreement with a local recycling company to provide all the material recycled with the recycling device in exchange for a monthly fee, a service fee, etc.

Additional forms of value may be generated by the recycling device such as goodwill. Goodwill may be generated by and/or for users, retail establishments, manufacturers, publishers, and other stakeholders. The recycling device may generate goodwill among users through the perceived environmental benefit of participating in recycling and/or through the economic benefit of receiving discount offers because of recycling. The recycling device may generate an increase in public goodwill for retail establishments and/or other entities by exhibiting the retail establishment's environmental responsibility and/or concern. The recycling device may be part of a retail establishments implementation of "green" programs. Similarly, publishers may experience an increase in public goodwill for promoting and/or participating in recycling programs associated with the recycling device due the public perception of environmental responsibility and/or concern. Likewise, a user's perception of a publisher's environmental responsibility may lead to increased periodical sales and/or subscriptions.

A method of generating revenue and/or goodwill through using the recycling device may include establishing a recycling program associated with the recycling device to encourage publishers and users to recycle periodicals. Publishers may enroll in the recycling program and provide discount offers for users that recycle periodicals published by the publisher. A recycling device may be located at a specified location such as at a retail establishment to encourage recycling. The recycling device may be preferably located in areas of high user traffic and/or proximate to periodicals. The recycling device may be configured to accept periodicals, correlate the periodicals with one or more discount offers, and provide those offers to users in response to recycling a periodical.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of recycling a periodical, the method comprising:
    receiving a periodical at a recycling device, the recycling device located at a retail merchant location;
    providing periodical information about the periodical to the recycling device in response to the periodical being received at the recycling device, wherein the periodical information defines subject matter of the content of the periodical;
    determining, by one or more processors, the subject matter of the content of the periodical from the periodical information, wherein the subject matter of the content of the periodical comprises a product, item, service or advertisement featured in the periodical;
    calculating, by the one or more processors, one or more marketing offers based on the subject matter of the content of the periodical and that relate to a product or service sold at the retail merchant location;
    displaying, by the one or more processors, the one or more of marketing offers at the recycling device;
    selecting, by the one or more processors, one or more of the marketing offers at the recycling device; and
    printing, by a printer at the recycling device, the one or more selected marketing offers.

2. The method of claim 1, wherein the periodical comprises a newspaper or a magazine.

3. The method of claim 1, wherein the step of providing periodical information to the recycling device comprises scanning a barcode printed on the periodical.

4. The method of claim 1, wherein the step of providing periodical information to the recycling device comprises manually inputting the periodical information using a keypad or touch screen display.

5. The method of claim 1, wherein the step of calculating one or more marketing offers based on the periodical information comprises:
    transmitting the periodical information from the recycling device to a processor that is removed from the recycling device, wherein the processor calculates the one or more marketing offers; and
    receiving at the recycling device the one or more marketing offers calculated by the processor.

6. The method of claim 1, wherein the printing of the one or more selected marketing offers comprises printing a coupon for a discount on a new periodical, good, or service.

7. The method of claim 1, wherein the method further comprises verifying that the periodical is deposited with the recycling device.

8. The method of claim 1, wherein the method further comprises redeeming the printed marketing offer by purchasing a new periodical, good, or service from the retail merchant location at which the recycling device is located.

9. The method of claim 8, wherein the printed marketing offer is compatible with a coupon redemption system of the merchant or service provider.

10. The method of claim 1, wherein calculating one or more marketing offers based on the subject matter of the content of the periodical further comprises:
    basing the one or more marketing offers on a type of the periodical and on readers associated with the type of periodical.

11. The method of claim 1, wherein selecting one or more of the marketing offers comprises receiving, at an input device at the recycling device, input from a user for selecting one or more of the marketing offers.

12. The method of claim 1, wherein the item featured in the periodical is an article in the periodical.

13. A system to recycle a periodical, the system comprising:
    a scanning device located at a retail merchant location to collect periodical information from the periodical, wherein the periodical information defines subject matter of the content of the periodical;
    a processor to calculate one or more marketing offers based on the subject matter of the content of the periodical and that relate to a product or service at the retail merchant location, wherein the subject matter of the content of the periodical comprises a product, item, service or advertisement featured in the periodical;
    a display device at the merchant location to display the one or more marketing offers;
    an input device at the merchant location to select one or more of the displayed marketing offers;
    a printing device at the merchant location to print the one or more selected marketing offers; and
    a receptacle at the merchant location to hold the recycled periodical.

14. The system of claim 13, wherein the system further comprises an opening in a surface of the receptacle through which the periodical is inserted.

15. The system of claim 13, wherein the system further comprises a verification device to verify that the periodical has been deposited in the receptacle.

16. The system of claim 13, wherein the scanning device is also a verification device to verify that the recycled periodical has been provided to the system.

17. The system of claim 13, wherein the processor is located at a site that is remote from the receptacle to hold the recycled periodical.

18. The system of claim 13, wherein the system further comprises a wired or wireless data transceiver for transmitting periodical information to a computer network.

19. The system of claim 18, wherein the data transceiver receives data about the one or more marketing offers from a site that is remote from the receptacle to hold the recycled periodical.

20. The system of claim 13, wherein the scanning device comprises a barcode scanner that can read a bar code on the periodical.

21. The system of claim 13, wherein the input device further comprises a keypad or touch screen display for inputting the periodical information.

22. The system of claim 13, wherein the display device and the input device are combined in a touch-screen display.

23. The system of claim 13, wherein the periodical comprises a newspaper or a magazine.

* * * * *